(12) United States Patent
Tourapis et al.

(10) Patent No.: US 9,055,278 B2
(45) Date of Patent: Jun. 9, 2015

(54) CONVERSION, CORRECTION, AND OTHER OPERATIONS RELATED TO MULTIPLEXED DATA SETS

(75) Inventors: Alexandros Tourapis, Burbank, CA (US); Peshala Pahalawatta, Glendale, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 740 days.

(21) Appl. No.: 12/652,982

(22) Filed: Jan. 6, 2010

(65) Prior Publication Data

US 2010/0171817 A1 Jul. 8, 2010

Related U.S. Application Data

(63) Continuation-in-part of application No. PCT/US2009/055819, filed on Sep. 4, 2009.

(60) Provisional application No. 61/143,087, filed on Jan. 7, 2009.

(51) Int. Cl.
*H04N 13/04* (2006.01)
*H04N 13/00* (2006.01)

(52) U.S. Cl.
CPC ......... *H04N 13/004* (2013.01); *H04N 13/0029* (2013.01); *H04N 13/0037* (2013.01); *H04N 13/0048* (2013.01)

(58) Field of Classification Search
USPC ................... 348/51, 441, 554, 705
See application file for complete search history.

(56) References Cited

U.S. PATENT DOCUMENTS

| 6,573,928 | B1 * | 6/2003 | Jones et al. | ...................... 348/51 |
| 2005/0024532 | A1 * | 2/2005 | Choi | .............................. 348/441 |

FOREIGN PATENT DOCUMENTS

| EP | 0306448 A2 | 3/1989 | |
| EP | 306448 A2 * | 3/1989 | ............. H04N 13/00 |
| EP | 0940995 A2 | 9/1999 | |
| EP | 940995 A2 * | 9/1999 | ............... H04N 9/64 |
| KR | 10-0374717 | 2/2003 | |

(Continued)

OTHER PUBLICATIONS

Soga, Y., et al., "Development of a Digital 3D Broadcasting System using Progressively Scanned Digital Broadcasting", Proceedings of the SPIE—The Intl Society for Optical Engineering, SPIE, US, Jan. 26, 1998.

(Continued)

*Primary Examiner* — Kyung H Shin

(57) ABSTRACT

Conversion of interleaved data and/or correction of color samples or other data are corrected by recognizing an underlying arrangement or format of different data sets within a data stream and a conversion process applied that causes bleeding between the sets The data sets are, for example, separate channel views of a 3D display, and the corruption occurs, for example, upon up-conversion of color samples that take into account both views together rather than individually. The invention is embodied, for example, as part of a playback device, display, or as a stand alone converter box that corrects the corrupted samples by at least one of substitution, filtering, or interpolation with appropriately selected samples (e.g., neighboring samples of a same view). In one embodiment, the invention comprises a conversion from a received format (e.g., checkerboard) to a delivery format (e.g., native format of a 3D ready display).

22 Claims, 9 Drawing Sheets

(56) References Cited

FOREIGN PATENT DOCUMENTS

| WO | 2007/093942 A2 | 8/2007 |
| WO | 2010/011557 | 1/2010 |
| WO | 2010/028107 | 3/2010 |

OTHER PUBLICATIONS

European Patent Office, "Notification of Transmittal of the Intl Search Report and the Written Opinion of the Intl Searching Authority, or the Declaration," mailed Apr. 12, 2009 for D08050WO01, Intl Application No. PCT/US2009/055819.

Hutchison, David C., "Introducing DLP 3-D TV" DLP Texas Instruments, pp. 1-5.

McCormick, et al., "Implementation of Stereoscopic and Dualview Images on a Micro-Display High Definition Television", 3DTV-Con08, May 28-30, 2008, Istanbul Turkey, pp. 33-36.

ITU-T Telecommunication Standardization Sector of ITU, Rec. H.264 (May 2003) "Advanced Video Coding for Generic Audiovisual Services" 269 pages.

HDMI Licensing LLC, "High-Definition Multimedia Interface" Specification Version 1.3a, Nov. 10, 2006, 97 pages.

Digital Content Protection LLC, "High-bandwidth Digital Content Protection System" Revision 1.3, Dec. 21, 2006, pp. 1-90.

Soga, et al., "Development of a Digital 3D Broadcasting System Using Progressively Scanned Digital Broadcasting" SPIE Stereoscopic Displays and Applications IX, San Jose, CA, USA, Jan. 1988, SPIE vol. 3295, pp. 278-285.

* cited by examiner

CB Interleaved Samples

Generic upsampling

Left View Samples

Right View Samples

FIG. 2

Left View Samples

Right View Samples

CONVERSION, CORRECTION, AND OTHER OPERATIONS RELATED TO MULTIPLEXED DATA SETS

CROSS-REFERENCE TO RELATED APPLICATIONS

This application is a continuation in part of PCT Application No. PCT/US2009/055819, filed Sep. 4, 2009 and claims priority to U.S. Patent Provisional Application Nos. 61/143,087, filed 7 Jan. 2009, hereby incorporated by reference in their entireties.

BACKGROUND OF THE INVENTION

1. Field of Invention

The present invention relates to data encoding and decoding, conversion of data with respect to a format or arrangements of the data, and the correction of errors from conversions without appropriate consideration of a format or arrangement of the converted data.

2. Description of Related Art

In recent years, content providers have become interested in the delivery of stereoscopic (3D) content into the home. This interest is driven by the increased popularity and production of 3D material, but also the emergence of several stereoscopic devices that are already available to the consumer. Although several systems have been proposed on the delivery of stereoscopic material to the home that combine specific video view "arrangement" formats with, primarily, existing video compression technologies such as ISO MPEG-2, MPEG-4 AVC/ITU-T H.264, and VC-1, these systems do not provide any information on how the video encoding process should be performed. This has consequently resulted in poorly designed stereo video encoding solutions with subpar performance, which has been detrimental in the adoption of such systems.

SUMMARY OF THE INVENTION

The present inventors have realized the need to provide a system for the provision of a stereoscopic (3D) user experience implemented with minimal or no alteration to existing playback devices such as set-top boxes, DVD, and Blu-ray disk players, as well as existing 3D capable displays. This comprises the provision of either an appropriate color conversion considering a format in which the 3D images are provided in a video stream or a device capable of correcting errors if the conversion is done without appropriate consideration of the format. The invention may be embodied in multiple forms as further described herein and may be part of a playback device, a display, set-top type converter box, and/or other embodiments as described herein. The invention also includes conversion to one or more alternative formats for the display of images. Such additional conversion may require additional hardware incorporated within or disposed between, for example, a video source (e.g., cable, Blu-ray, set-top box, satellite receiver, etc.) and a display. Such conversion allows the advantages of decoding as described herein to be available in a wide variety of native formats utilized by display devices.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is an illustration of pixel replication performed via a generic upsampling;

DESCRIPTION OF THE PREFERRED EMBODIMENTS

Exemplary 3D displays are, for example, recently developed DLP and Plasma displays by Samsung and Mitsubishi, which will benefit from a system according to the present invention for the provision of a stereoscopic (3D) user experience. Other displays will eventually be offered in need of the same or similar capabilities.

One format for the delivery of 3D content is to multiplex the two views using a checkerboard (CB) arrangement. Although this arrangement can be done using different color spaces or color configurations, because of limitations in existing devices, creation and encoding is typically performed in the YCbCr colorspace using, for example, a 4:2:0 color sampling process.

Figure 1A:
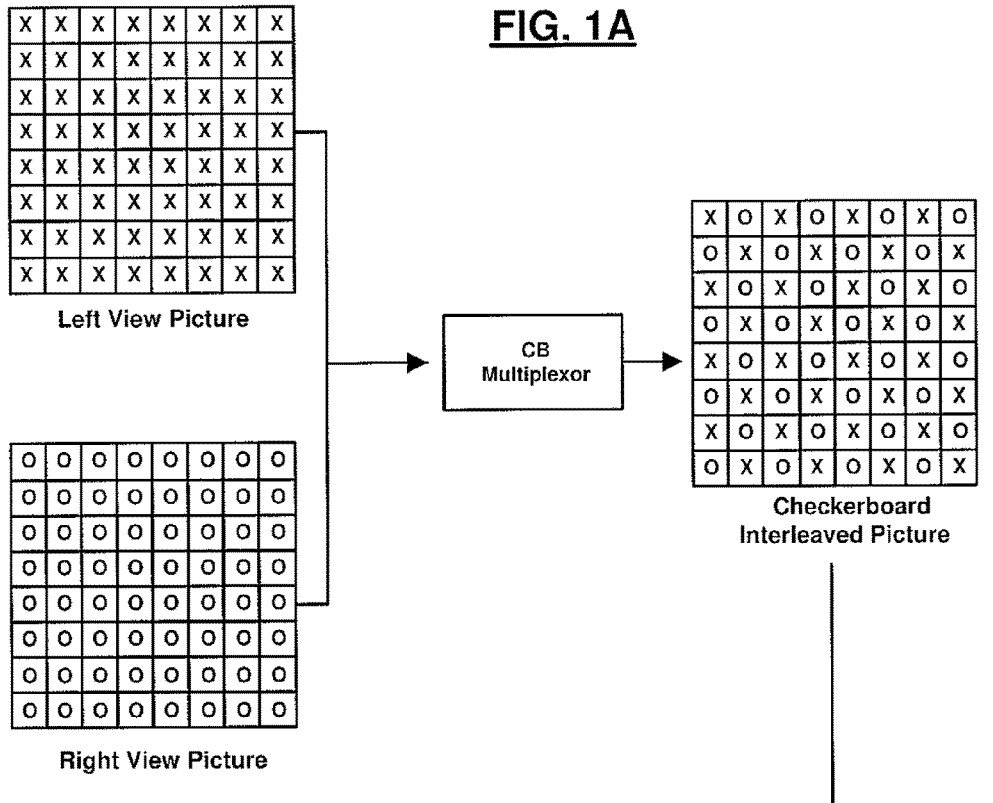
FIG. 1A is an illustration depicting a pixel arrangement for a checkerboard interleaving scheme, and the subsequent deinterleaving.
Figure 1A:
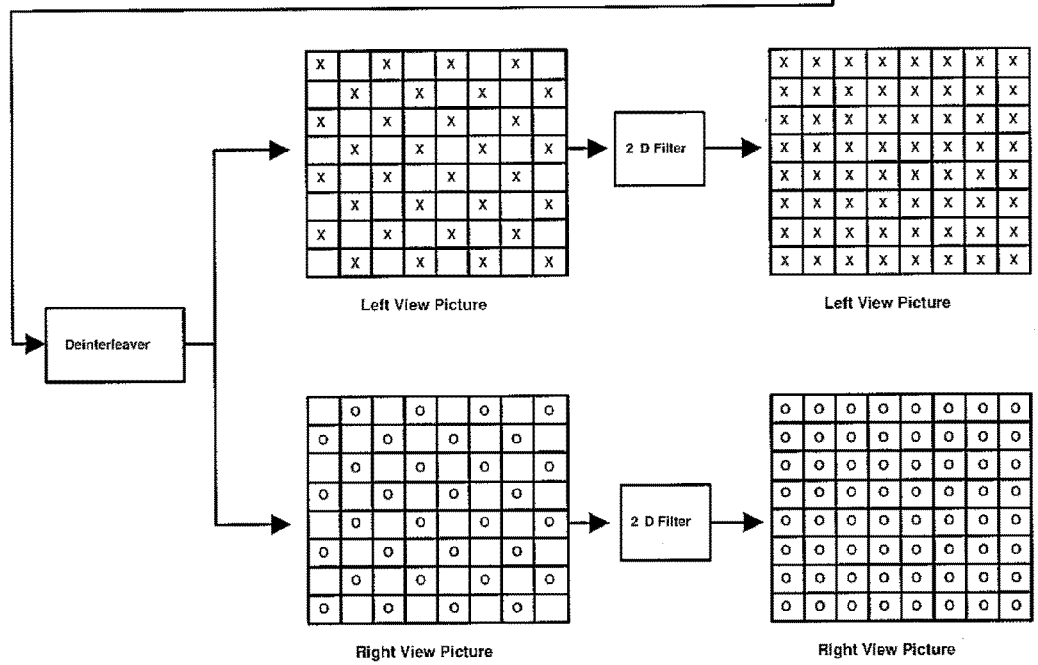

Delivery of 3D content using the checkerboard method implies interleaving of the left and right view images using a checkerboard (CB) arrangement (or format). Although this arrangement may complicate and impact the encoding process, it helps to better preserve the frequency characteristics of the 3D signals compared to other comparable techniques such as interleaving the 3D views in a row or column interleaved arrangement or placing the views side by side. The pixel arrangement for the checkerboard interleaving scheme, and the subsequent deinterleaving that will be performed at the display device, are depicted in FIG. 1A.

For some display devices, such as existing DLP TVs, the deinterleaved images will be displayed as is exploiting the characteristics of the display mechanisms, while in others, such as Plasma displays, additional interpolation/upsampling may be performed in order to bring the image to its full, original resolution. Ideally, if no compression or other conversions are performed onto the original, CB source, no blending of the information from the original left and right views in the final, deinterleaved, left and right views at the display is expected. In reality, however, because of lossy compression information leakage from one view to another may occur. This could result in undesirable artifacts during 3D display. Nevertheless, this problem can be considerably constrained and controlled by introducing a variety of considerations into the encoder such as avoiding or negatively biasing certain coding tools, e.g. deblocking filter, subpixel motion positions etc. (see, for example, Tourapis et al, U.S. patent application Ser. No. 60/082,220, entitled "Encoder Optimization Of Stereoscopic Video Delivery Systems," the contents of which are incorporated herein by reference in their entirety).

Unfortunately, problems may happen in the case that either the video source is upconverted in the decoding device or display, or if color and format conversion is requested without any considerations of the format arrangement. The first may result in completely damaging the characteristics of the signal, while the later may result in color bleeding problems from one view to the other especially around regions with high view disparity characteristics. Color bleeding typically occurs because chroma information is usually subsampled and signaled at a lower resolution than luma information for video compression and the delivery or display mechanism requires a completely different chroma subsampling or even color format to be used.

More specifically, YUV 4:2:0 subsampling is most commonly used in which the chroma components are subsampled to half the horizontal and vertical resolution. The location of the chroma samples relative to the luma samples of the video frame may vary. This format is mandated by many video coding systems, including applications for video content delivery to the home using broadcasting and digital video recording (DVD, Blu-ray, HD-DVD etc) media. In the case of YUV 4:2:2 subsampling, only the horizontal resolution of the chroma is halved and each chroma sample corresponds to two horizontally adjacent luma samples. Other less common arrangements such as YUV 4:1:1, 4:2:1, 4:1:0, 8:4:4, 3:1:1 and possibly others could also be encountered. It is also possible to encounter cases with no subsampling, i.e. 4:4:4 Y'CbCr and R'G'B' sampling.

Delivery, however, can be constrained by the delivery interface, e.g. High-Definition Multimedia Interface (HDMI) or Digital Visual interface (DVI), which may impose certain characteristics on the color sampling and color format. In particular, the HDMI interface only supports outputs in xvYCC 4:4:4, sRGB 4:4:4, YCbCr 4:4:4, and YCbCr 4:2:2, while existing 3D enabled displays, such as several Samsung DLPs, require that 3D inputs are formatted as sRGB 4:4:4. However, since the original checkerboard source material is formatted as YCbCr 4:2:0, a conversion process, that includes upscaling the chroma components (e.g., using simple pixel replication) and color conversion is utilized. Unfortunately, if no consideration is made for the nature of the content, i.e. checkerboard format or interleaving of the two views, during upconversion, this may result in severe color artifacts especially around objects with high disparity.

An example of such a scenario where color information from the right view has "leaked" into the left view would be where an object exhibits a color bleeding artifact. Such artifacts will become apparent in 3D imagery by a shadow at a border of the objects. For example, a 3-D image of a glove may include, for example, an undesirable color bleeding apparent with a reddish shadow just past the border of the glove. These artifacts are most apparent at boundaries but are also included the full view and are better explained by showing how the bleeding problem occurs.

Figure 2:
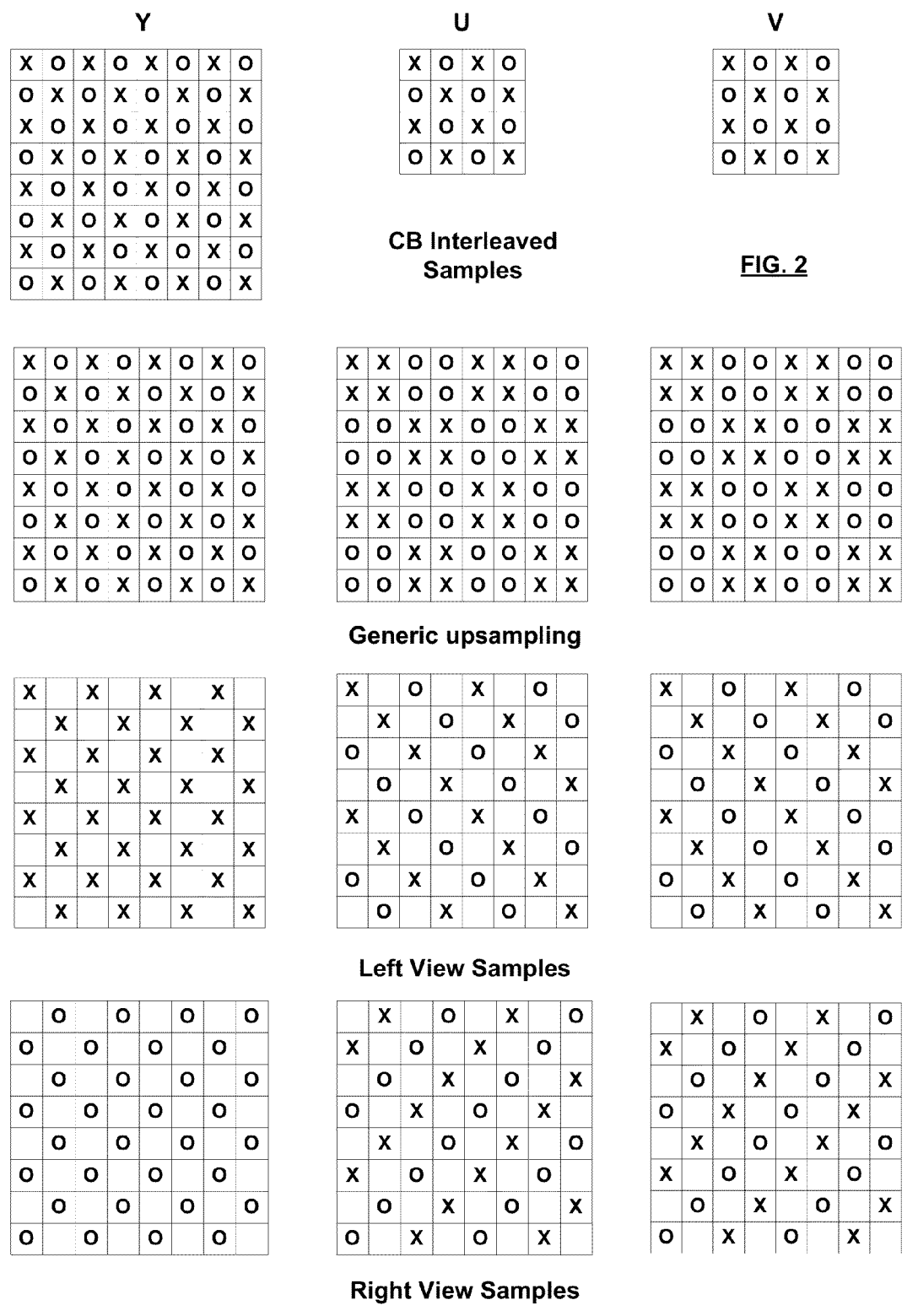

This bleeding problem is primarily inherent of the upscaling process performed in almost all of the existing systems. In particular, if the upconversion of the chroma components does not account for content that is checkerboard formatted, it would try to upscale the chroma samples using simple filtering mechanisms that consider all samples from both views. In the simplest and most commonly used method, pixel replication is performed as shown in FIG. 2 (generic upsampling). In this scenario, it can be seen from FIG. 2 that when deinterleaving the new sequence to generate the two separate views for display (left view samples and right view samples), half of the pixels in each view would be incorrectly assigned with color samples corresponding to the opposite view. The problem may be somewhat aggravated if color conversion is also performed because of clipping and rounding operations. It is possible that use of an advanced interpolator, all of the samples could be incorrect due to the filtering.

The problem occurs to a greater or lesser extent regardless of the interleaving pattern or the upconversion process utilized, unless, by design or coincidence, the upconversion process accounts for the interleaving of the views. The problem also occurs regardless of whether the views are 3D views or entirely different images, video, or other data. The problem is likely exasperated if the images are entirely different (e.g., separate programs) because the images have no similarity (e.g., instead of an artifact that, for example, shadows the intended image, the artifact is likely of an entirely different shape).

To resolve this problem, the present invention provides several embodiments for solutions. For example, given that already available devices have this problem, a separate converter box may be used that tries to correct this issue. This box can be placed at the output of the playback/decoder device and after any necessary decryption or other processing of the signal (e.g. HDMI), can convert the input signal (e.g., a 3D checkerboard multiplexed format with improper upconversion and therefore color or other artifacts) to a new signal appropriately corrected and repackaged (e.g. HDMI) and re-encrypted. This new signal could contain additional metadata information that could help drive or seamlessly control next generation 3D capable displays that can recognize these signals. In general, the output of the converter will then be connected to a 3D capable display, but could also involve other devices, such as a multimedia receiver, an HDMI bridge, HDMI to DVI or vice versa converters etc, prior to reaching a display, or some other medium. The converter box may include, for example, a pattern recognizer that searches for known patterns of color errors and then applies a most appropriate schema for correction. Such recognition may comprise, for example, comparing diagonal patterns of chroma samples in one view against diagonal patterns of chroma samples in an opposite view. A close match on the opposing diagonals may trigger the color correction processes. The device may include a database of patterns from which to recognize and then apply an appropriate correction schema. Each pattern comprises, for example, a pattern of errors associated with a combination of an interleaving arrangement (or format) and a conversion (e.g., up-conversion) and is associated with a schema specifically derived to correct or otherwise minimize errors occurring due to the interleaved/conversion combination.

Figure 3A:
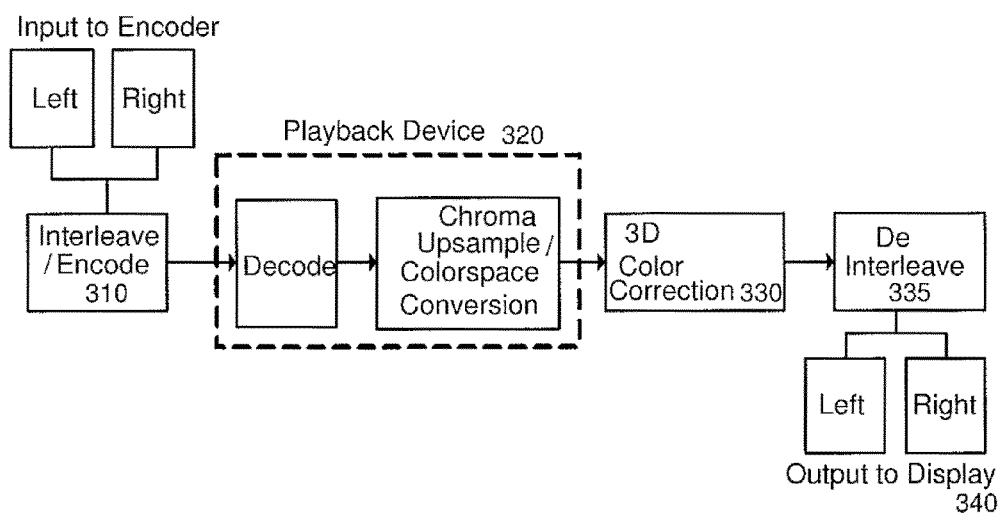
FIG. 3A is a block diagram of a system 300 incorporating a converter box (3D Color Correction) 330 according to an embodiment of the present invention.

FIG. 3A is a block diagram of a system 300 incorporating a converter box (3D Color Correction) 330 according to an embodiment of the present invention. The system starts by encoding left and right images which includes, for example interleaving the left and right images. A playback device 320 decodes the interleaved images and, for example, performs an upconversion/conversion of the chroma color space (e.g., an upconversion as described above or a variant thereof).

The converter box (3D color correction) 330 performs a process that involves performing colorspace conversion, if necessary, back to its original (e.g., YCrCb), replacement of incorrect color samples with samples derived from the same view (e.g., using pixel replication or more advanced filtering methods, including temporal interpolation such as a motion compensated or motion adaptive temporal filter, while considering samples only from the same view), followed by colorspace conversion to the desired colorspace and/or format (i.e. sRGB 4:4:4).

It should be noted that in various likely implementations, the converter box 330 would require, among other things an HDMI receiver and encoder, which also involve encryption/decryption licensing and would further increase overall cost. Note that this converter box may also optionally add additional metadata information that could help with the playback and conversion of the 3D data in future displays.

A deinterleave device then extracts or otherwise builds the left and right images to be displayed by selecting appropriate portions of the color corrected and decoded, but interleaved images. The deinterleave device is, for example, a checkerboard deinterleaver, but may also be configured to operate on images interleaved in any of line-by-line, side-by-side, or other interleaving formats.

Figure 3B:
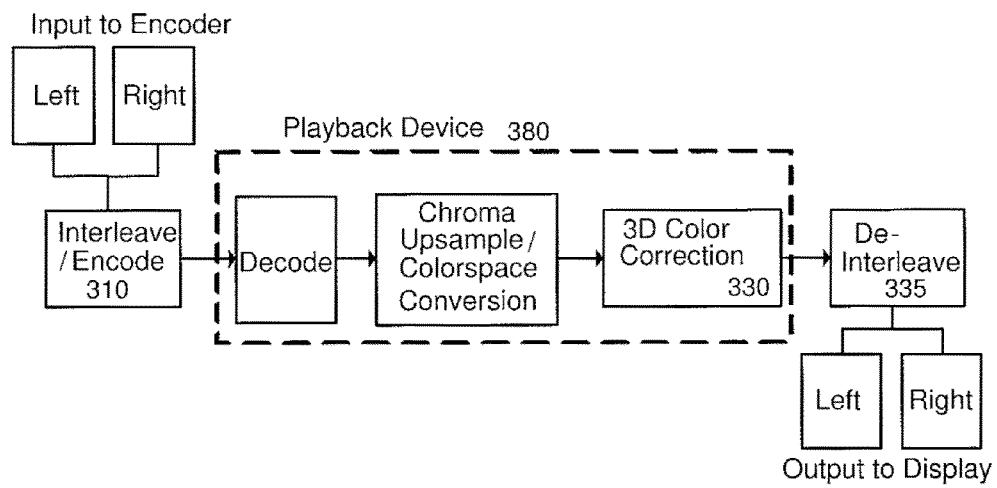
FIG. 3B is a block diagram of a system incorporating a playback device 380 according to an embodiment of the present invention.
Figure 3C:
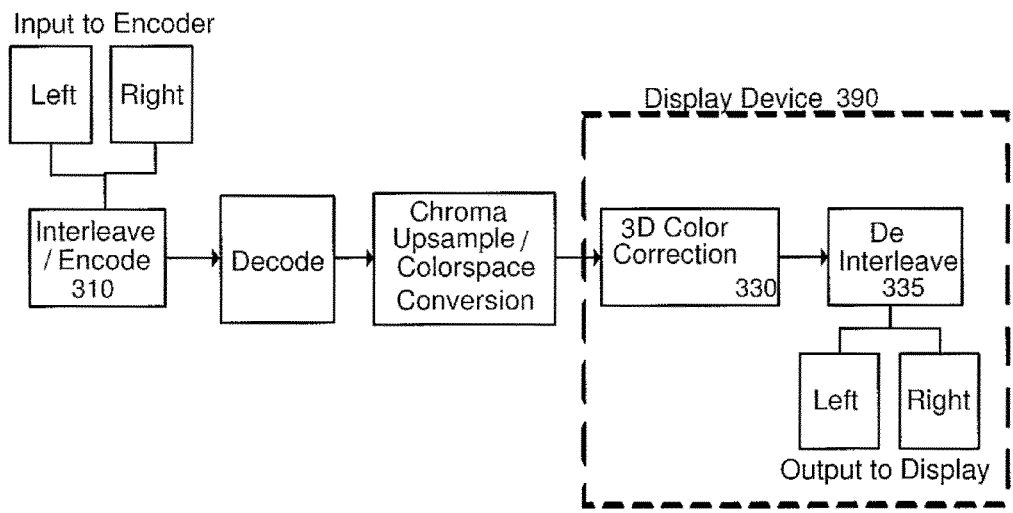
FIG. 3C is a block diagram of a system incorporating a display device according to an embodiment of the present invention.

The above process (or others as described herein) could be added directly on the display (e.g., display 390 in FIG. 3C). This avoids having to add additional HDMI related hardware. If a display is designed with programmable chips, the provision of further color conversion mechanisms would be facilitated (alternatively as a retrofit). Alternatively, the sets are redesigned with new hardware specifically for these tasks.

In one embodiment, a "proper" chroma upconversion method is included in the decoder system. This is apparently the "best" solution especially since it avoids difficult to reverse problems due to clipping or rounding, reduces processing (essentially replaces the original upsampling process which needs to be performed regardless of the conversion), and, again, does not add any additional cost due to HDMI licensing.

The decoder system may be, for example, the display itself (built into the display), a set-top box (cable box, satellite box, converter box, etc), DVD player, Blu-ray players, or any playback device (e.g., see playback device 380 in FIG. 3B), as well as existing 3D capable displays. While existing 3D display will generally reap the greatest immediate benefit from such devices/improvements, the invention is not limited to supplying such devices, as the interleaved formats may be utilized for the provision of content to standard displays (see below), and newly developed technologies will clearly benefit from the improvements in content delivery as elaborated on herein.

Figure 4:
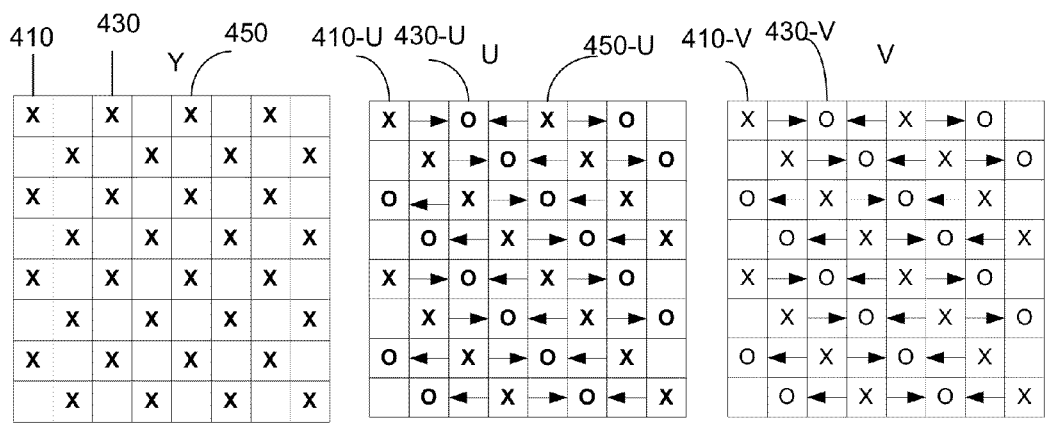
FIG. 4 is an illustration of a basic process that performs color correction according to an embodiment of the present invention.
Figure 4:
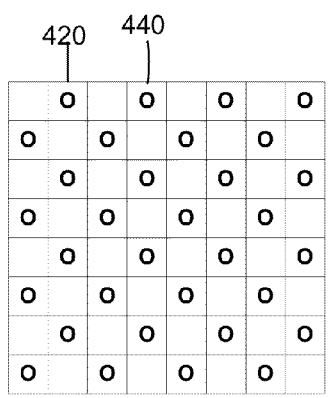
Figure 4:
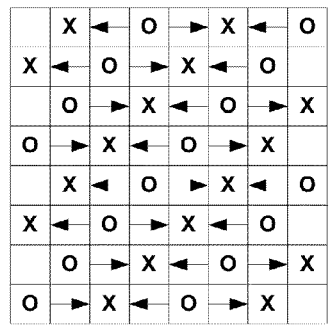
Figure 4:
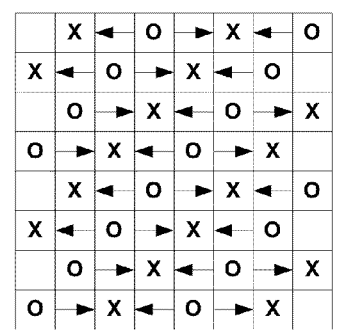

FIG. 4 illustrates a basic process that performs color correction, as would be performed, for example, in the converter box 330. This process performs a horizontal replacement of incorrect view samples using correct horizontal only samples. For example, a left color sample value 410 in the Cr space that has corrupted the right color samples is replaced by a neighboring right sample Cr (e.g., replace with either sample 405 to its left or sample 415 to its right).

Diagonal or/and vertical replacement filtering of appropriate same view samples could also be considered. In alternative embodiments, averaging, filtering, extrapolation, or interpolation are utilized to determine the replacement chroma value.

Figure 5:
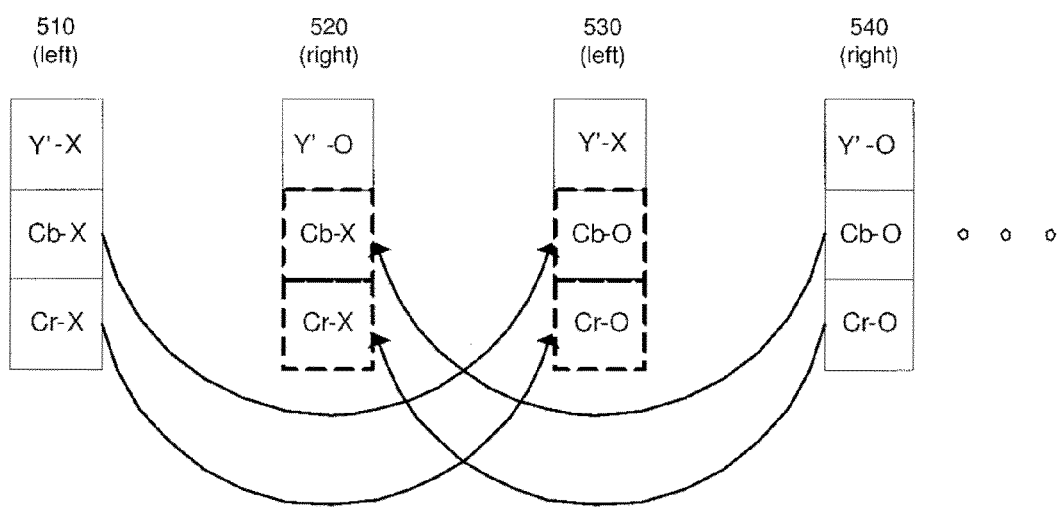
FIG. 5 is an illustration of a serial type sample replacement according to an embodiment of the present invention.

The same process, using only sample replacement, is illustrated in FIG. 5 assuming serial processing as is likely to be performed on the HDMI based converter box. Such an embodiment uses, for example, a buffer that stores N samples. The number of samples stored in the buffer would depend on the number of samples used in a filtering scheme and on how far apart the samples may be (e.g., diagonal replacement may require more stored samples than a neighboring sample replacement).

As shown in FIG. 5, left (X) and right (Y) samples of an interleaved 3D image are serially output from a playback device. The samples are stored in a buffer and then replaced. Sample 510 is an uncorrupted left sample, sample 520 is a right sample having a corrupted chroma portion, sample 530 is a left sample having a corrupted chroma portion, and sample 540 is an uncorrupted right sample. As shown, the Cb and Cr portions of the corrupted samples are replaced with the Cb and Cr from their neighboring uncorrupted samples. This assumes that signal is YCbCr. If signal is RGB, then all samples should be reverted back to YCbCr color space, perform correction, and then perform color conversion again. This is still a replacement process but it is a replacement process done in the color transform domain.

The replacement samples comprise, for example, the nearest neighboring uncorrupted sample of the same view (left corrupted samples are replaced with neighboring, if available, left uncorrupted samples). As noted, alternative schemes including averaging, filtering, interpolating, or extrapolating from one or more (perhaps several) neighboring samples could be performed. And, the samples chosen can be neighboring horizontal, vertical, or diagonally related to the replaced sample. Some embodiments might even consider the effect of samples further than just the neighboring samples in a multi-sample filter or weighted averaging scheme.

Again, assuming that the colorspace is the same as that of the original source, correction can involve a simple replacement, or some other filtering process of the incorrect view samples in the chroma components with those of neighboring samples from the same view. In a certain embodiment only horizontal samples are considered and the process is performed using bilinear filtering. In a different embodiment, simple replacement is performed with either the nearest neighboring sample from the same view, or from a sample always in the same direction. In an further embodiment different or all directions could be considered, and a variety of filters could be used to generate the missing samples. This could provide a variety of complexity (memory, speed, delay) and performance (interpolation and image quality) tradeoffs.

If, however, a different colorspace than that of the original content was used, e.g. RGB or xvYCC, XYZ among others, the process may also involve apart from sample correction a color correction process. This could be done using either a multistage approach where one first reconverts the samples in error to the original color space, determines the correct color values in the original space given the above method, and then performs color conversion to the required space. In a different embodiment, color conversion could be performed in a single step by combining neighboring samples. For example, assuming that color conversion from one color space to the other and vice versa is performed as:

$$\begin{bmatrix} C_0 \\ C_1 \\ C_2 \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} A_0 \\ A_1 \\ A_2 \end{bmatrix} + \begin{bmatrix} b_0 \\ b_1 \\ b_2 \end{bmatrix}$$

and $$\begin{bmatrix} A_0 \\ A_1 \\ A_2 \end{bmatrix} = \begin{bmatrix} c_{00} & c_{01} & c_{02} \\ c_{10} & c_{11} & c_{12} \\ c_{20} & c_{21} & c_{22} \end{bmatrix} \begin{bmatrix} C_0 \\ C_1 \\ C_2 \end{bmatrix} + \begin{bmatrix} d_0 \\ d_1 \\ d_2 \end{bmatrix}$$

and $C_x^T$ are neighboring samples without color problems, $C_x^B$ samples for the current pixel with problems, then one could compute the corrected samples $C_x^C$ as:

$$\begin{bmatrix} C_0^C \\ C_1^C \\ C_2^C \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} c_{00} \times C_0^B + c_{01} \times C_1^B + c_{02} \times C_2^B + d_0 \\ c_{10} \times C_0^T + c_{11} \times C_1^T + c_{12} \times C_2^T + d_1 \\ c_{20} \times C_0^T + c_{21} \times C_1^T + c_{22} \times C_2^T + d_2 \end{bmatrix} + \begin{bmatrix} b_0 \\ b_1 \\ b_2 \end{bmatrix}$$

Different color transforms could be considered accordingly, while it is possible that a completely different color transform and color sampling may be desired altogether. Appropriate color format selection and necessary color correction can be performed given knowledge of the original input signal, the current formatting of the content, and the final output device, e.g. display capabilities.

Since in certain interfaces, such as HDMI, the signal will be received and decoded serially by the color correction module, in one embodiment, the memory requirements as well as the latency introduced by the color correction module can be minimized by performing the color correction also in a serial fashion. As illustrated in FIG. 5, the color correction module only requires one neighboring pixel of the same parity view to perform a color correction on a given pixel (i.e., only 3 pixels need to be buffered). In this case, the chroma components, which are known to be correct, of the nearest neighboring pixel of the same parity, are copied to replace the incorrect chroma components of the current pixel. Color correction can be performed, if necessary, as described previously.

Further refinements that improve the color reconstruction but require the buffering of a larger number of pixels are also possible at the cost of increased latency and memory requirements. In a certain embodiment color correction is performed given previously received samples (i.e. causal color correction), or also consider N additional future samples. Future samples could be also constrained to be only on the same row or also allow M additional rows to be considered. In a further embodiment, color correction and interpolation of the samples could consider the entire picture, or even temporal samples from previous or past pictures. For this purpose one may consider, for example, only co-located, temporally, samples, assuming no view parity change, or also consider motion adaptive or motion compensated methods. View parity changes can also be considered accordingly.

Assuming that the interface of interest is HDMI, or something equivalent, and that a correction device is to be implemented, then this device may also have to perform decryption and encryption operations such as the High-bandwidth Digital Content protection HDCP. In a certain embodiment, decryption and optionally encryption are performed before and after color format conversion and color correction. It is also possible to signal the existence of 3D content, the color format sampling that the content is currently in, and if the current format requires any additional color correction prior to display.

Furthermore, it is possible to also signal optional postprocessing, ideal interpolation filters for chroma but also for 3D view upsampling, e.g. such as the one required by plasma displays to currently properly display checkerboard interleaved video signals, by using additional control information available in such interfaces. Information could be signaled separately for each view since their characteristics may be quite different. In particular, the HDMI specification allows such information to be provided within the vendor specific data block, while it may be possible to also provide similar information at a higher level, i.e. within a bitstream using other metadata transmission mechanisms, e.g. MPEG-4 or MPEG-2 systems metadata, SEI messages within an H.264/MPEG-4 AVC bitstream etc. In a certain embodiment, an input device is appropriately initialized given this metadata information, and can automatically, or selectively given user interaction, process the content for optimal delivery to the user.

In various embodiments, the color formatting, upscaling, and correction module can be implemented within the decoder prior to transmission of the signal to the display device, or alternatively within the display device. Optionally, in the display device, the input signal can be restricted to a single format, i.e. RGB 4:4:4 which would only require color correction to be performed reducing the cost and foot print of the device. In both scenarios, additional HDMI handling may be unnecessary since such is already handled by the device itself.

Using existing mechanisms for rescaling (downscaling and upscaling) CB interleaved video content would result in damaging the 3D nature of the content. To alleviate this problem, apart from the above mechanisms introduced for chroma correction, the present invention also introduces rescaling for CB content by considering its characteristics. More specifically, instead of performing rescaling using all samples in a neighborhood of a pixel, only samples belonging to the same view are considered for rescaling. Furthermore, view samples are generated again by considering their sample positions in the CB placement as to ensure proper 3D content reconstruction. In a certain implementation this can be done by first deinterleaving the content to generate the separate views, optionally replacing the missing samples, and then resampling the two views separately. Finally the images are interleaved using the CB pattern once more. In an alternative embodiment, this process could be done without performing deinterleaving but appropriately designing filters for each pixel position given its view correspondence (i.e. assuming separable filters these could be of the form [a2 0 a1 0 a0 0 a1 0 a2] etc).

The above description could be generalized for signals comprising of multiple views more than 2, or signal comprising of two or more completely separate/independent image views (non 3D) that may have been interleaved together for purposes such as exploiting the characteristics of a display or other applications (e.g., multi-player video games, driver/passenger display with different content option etc).

One embodiment involves allowing the system to select one of the views this could be done by the user or maybe by other metadata included somewhere else in the chain, deinterleaving this particular view, interpolating this view and only this view and then transmitting that view to a display device.

The selection of the view could be done at the start of the sequence, every GOP, or adaptively given the signaling of the metadata information. This process would enable non 3-D displays to still display the content in a 2-D mode enabling backwards display compatibility. In other embodiments, the views interleaved are not 3-D views, but instead entirely different images or video sequences.

Figure 6:
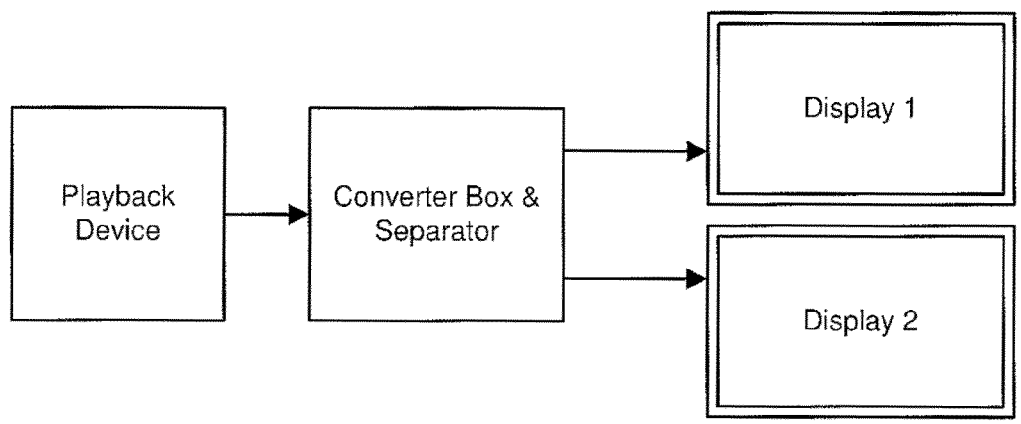
FIG. 6 is a block diagram illustrating an embodiment where two views are deinterleaved, upscaled from CB to full resolution and then displayed on two display devices using parallel HDMI interfaces.

In one embodiment, as shown in FIG. 6, a device according to the present invention is configured such that both views are deinterleaved, upscaled from CB to full resolution and then, using two "parallel" HDMI channels send to different displays or send to a display that uses a different 3D displaying method that assumes the use of full resolution images. In an alternative, these two upconverted views are again re-multiplexed. Multiplexing can still occur using the checkerboard method. The provision of two HDMI (or other) outputs and the corresponding functionality may also be provided in a different arrangement of formats for the two images (i.e. full left view first, right view second, or left view row first, right view row second etc).

Figure 7:
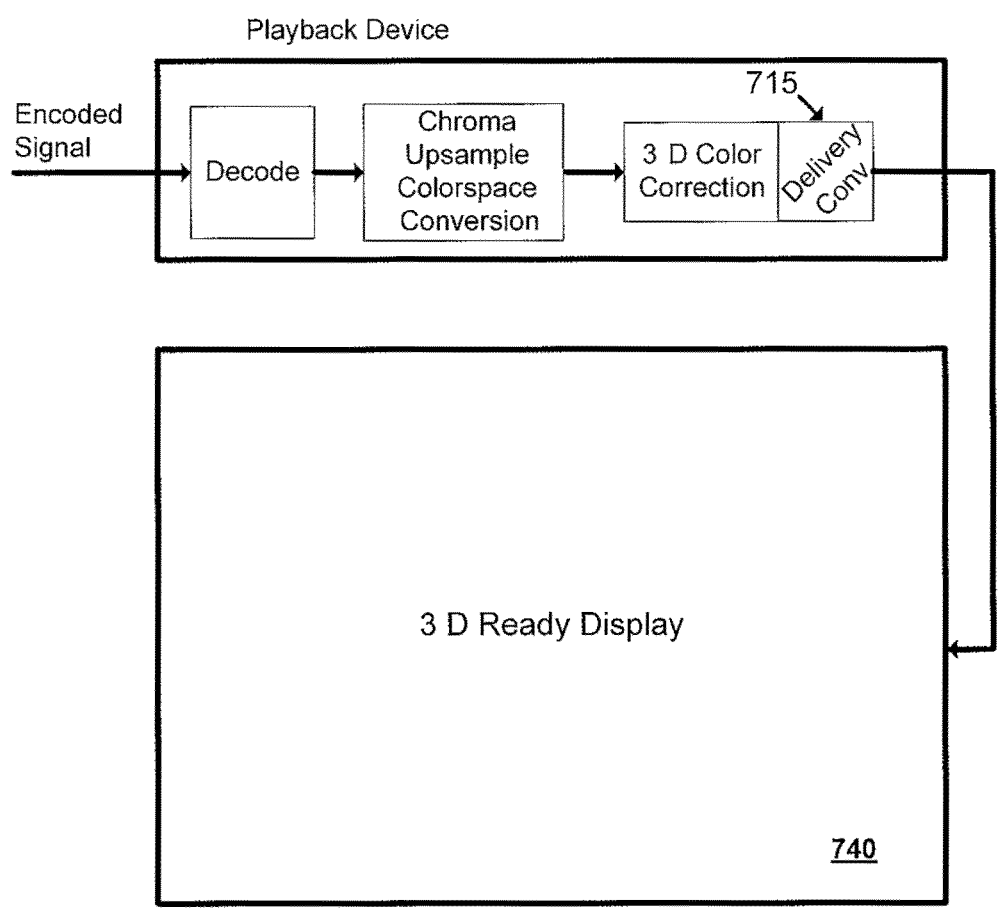
FIG. 7 is a diagram of a system including format conversion according to an embodiment of the present invention.

In one embodiment, the provision of outputs (e.g., delivery format) comprises an output provided in a checkerboard interleaved or multiplexed format that is suitable for 3D ready televisions or displays utilizing checkerboard interleaving as its native input format (e.g., current Samsung 3D ready displays). However, as noted above, the multiplexed format may be a different arrangement or format. FIG. 7 is a diagram of a system 700 according to an embodiment of the present invention. A playback device 710 includes components for decoding, chroma upsampling, and 3D color correction as described further above. In addition, a delivery format conversion 715 is performed. Although shown as part of an image chain that includes components for decoding, upsampling, and correction, the conversion may be applied separate and apart from those components. The delivery format conversion is, for example, a conversion from checkerboard interleaved 3D images to another delivery format (e.g., full left view first, right view second, or left view row first, right view row second etc.) The output of the conversion may then be provided directly to a 3D ready display 740 or another device that utilizes the converted to format as its native delivery format.

The conversion from a checkerboard delivery format to the native delivery format of a display may occur, as described, in a playback device, or may be embodied in an add-on converter box between a playback device and the display, or in the 3D ready display itself (as part of, for example, the internal circuitry or programmed functionality of the display).

For example, a conversion from checkerboard format to a side-by-side format may be performed by first taking each alternate line and rearranging CB data to side-by-side, while the data in the other lines are first interpolated and then arranged to side-by-side. Note that a filter (or filters) could be applied on both lines in various ways, i.e. prior to rearrangement but preferably constraining the filter so that it does not go across different views, or after rearrangement and in the new format (but again while making sure no or little contamination is made). The "little" contamination refers to the circumstance that contamination can be a bit forgiving for view boundaries (such as the column in the middle of the side-by-side arrangement). The conversion could be done in any color format or space, including YUV 4:2:0 or RGB 4:4:4.

Figure 8:
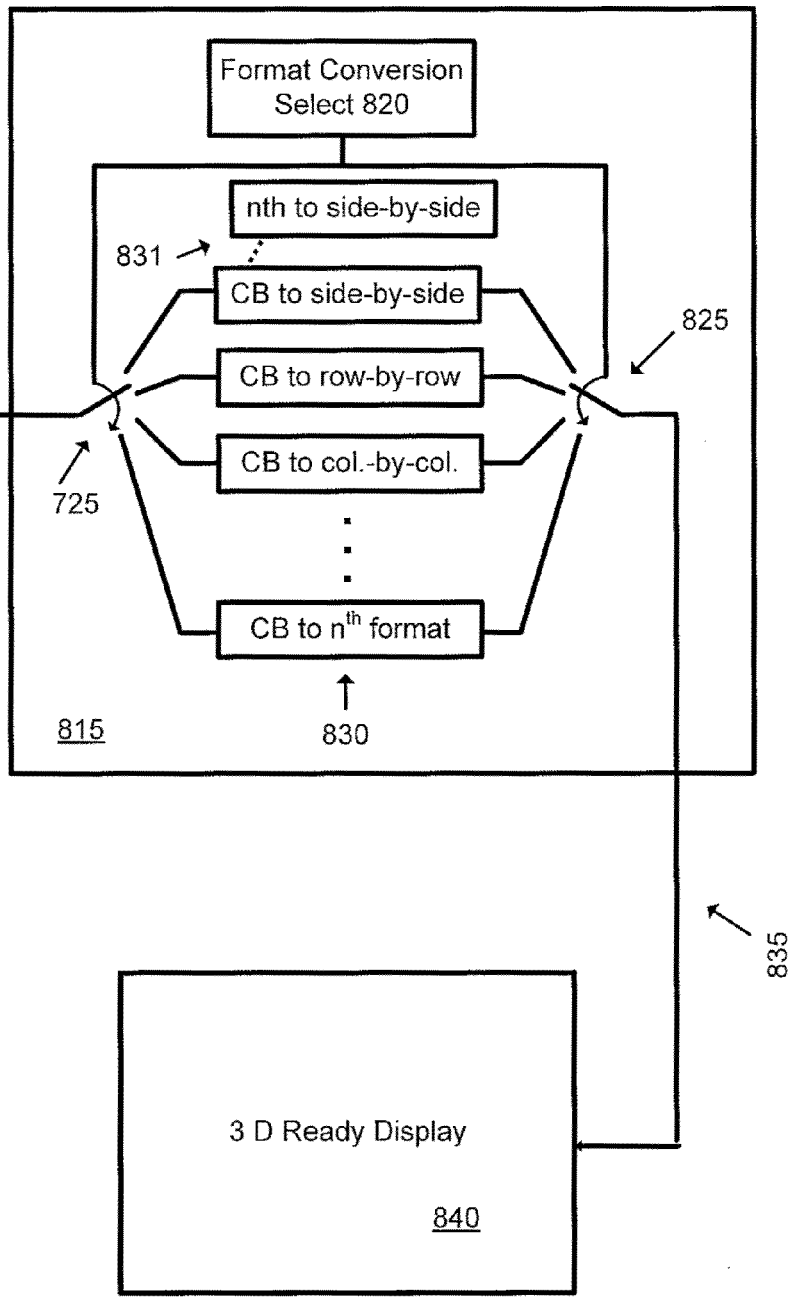
FIG. 8 is a diagram of an exemplary format converter according to various embodiments of the present invention.

FIG. 8 is a diagram of a format conversion process according to an embodiment of the present invention. An interleaved image data stream (e.g., shown as checkerboard interleaved image data) is provided to a conversion device 815. The conversion device may be, for example, circuitry configured to perform conversion from the input format 810 to an appropriate output format 835. The conversion device may also be embodied in many forms including electronic circuitry, software, firmware, combinations thereof, and/or any form of programming specifically designed to convert the data of the input format 810 to the output format 835. Such conversion may include, for example, additional interpolation and/or upsampling in order to generate samples that may be required by that new format. The interpolation methods could include, for example, any of the interpolation, correction, and/or upsampling techniques described herein, or as described in Pahalawatta et al., U.S. Patent Application No. 61/140,886, entitled "Content Adaptive Sampling Rate Conversion For Interleaving And Deinterleaving Of Images", and filed on Dec. 25, 2008, the entire contents of which are incorporated herein by reference and a copy of which is attached hereto.

Format conversion select 820 comprises, for example, a data signal that instructs the programming and/or internal circuitry of the conversion device as to which format is to be converted from and which format is to be converted to. Ideally, the format to be converted from is the checkerboard interleaved format as illustrated. This allows for the advantages specifically related to checkerboard formatted images described above to be realized in delivery formats other than checkerboard. Conversion from a single format other than checkerboard may also be advantageous if a format other than checkerboard is utilized in storing or transmitting the video data. In addition, other formats might have an advantage in one or more respects and/or be utilized for economic reasons, but may themselves need to be converted to checkerboard or another delivery format. Thus, in one embodiment, the conversion is from a single format (e.g., checkerboard), to a selected other format.

Format conversion select 820 may be, for example, data input from a switch, set-up option (e.g., programmed via a remote control of a playback device, display, or converter box of which the device 815 is employed), or a metadata signal contained in or extracted from the interleaved image stream itself, or another form a signaling. SEI messages may be utilized to suggest an appropriate format conversion. Format conversion select 820 may also utilize data received from a display (e.g., signaling from HDMI interface from display to the 815.

Format conversion select 820 may be configured, for example, to operate "switches" 725 to direct flow of the input format 810 to an appropriate converter (e.g., one of converters 830), and then route the output format 835 appropriately (e.g., to a 3D read display 840 using the output format of the selected converter as its native delivery format).

In another embodiment, the conversion is from any intermediate format utilized in either storage or transmission of the images to any deliver format of a display. As such, conversion device 815 may be configured with additional conversion processes (e.g., converters 831) that take into account different intermediate formats. For example, conversion from side-by-side to checkerboard. In such embodiments, format conversion select 820 comprises a selection of a converter that considers both the intermediate format and the delivery format.

The intermediate format may also be determined by the converter, for example, via messaging, set-up data, and/or metadata. In one embodiment, the format conversion select 820 may comprise a mechanism whereby at least a portion of the input format 810 is sampled and analyzed to automatically determine a format of the input format 810. Such sampling and analysis may be done periodically so as to be aware of any change in the received intermediate format. In another embodiment, the intermediate format is selected by a user during device set-up.

The invention includes the incorporation of a converter device 815 as part of a display, allowing the display to, in essence, have a plurality of native formats that can be displayed. The converter may, for example, determine the input format via messaging, set-up values, and/or by periodically sampling and analyzing an input signal. The determined format is then used to select an appropriate converter that converts the intermediate format into a format matching the true native format of the display. The appropriate converter may be selected form, for example, a series of converters that operate on different input formats converting each to the true native delivery format of the display. For example, if the true native delivery of a display is side-by-side, then the format conversion select would choose between a series of converters from, for example, checkerboard to side-by-side, over-under (down-under) to side-by-side, line or column alternate to side-by-side, CB with switched views to side-by-side, pixel level CB to block level or frame level CB to side-by-side, full resolution to side-by-side, and other formats to side-by-side, and then provide the video data converted to side-by-side into the signal feed mechanism(s) of the display. In addition, the incorporated converter would include a no-converter route for playback devices (or other converters) already providing the video data in the native side-by-side format. This would make the display appear to have numerous native delivery formats. A similar no converter route would also be provided in other embodiments described above.

Although the present invention has been described herein with reference to 3D views interleaved, encoded, decoded, and corrected, it should again be clarified that the present invention does not require, nor should it be limited to 3D views, or views at all, and is more generally described as the color format/sampling conversion and/or, if needed, correction of data errors due to some type of conversion that fails to take into account the interleaved format of the data sets. The present invention may be applied to any data stream using any type of interleaving method (checkerboard, line-by-line, etc.). The devices and processes of the present invention may be applied to data sets of any type or mixed types, including audio or general data information.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing an HDMI interface, any other equivalent device, or any device having at least part of the functionality of an HDMI device should be considered, such as, for example, DVI, RGB, or other data/information interfaces or any other device having an equivalent function or capability, whether or not listed herein. Furthermore, the inventors recognize and have specifically stated that newly developed technologies not now known may also be substituted for the described parts and still not depart from the scope of the present invention. All other described items, including, but not limited to interfaces, buffers, conversion processes, interleaving arrangements (or formats), coding, decoding, and display techniques, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, substituting chroma samples, averaging samples, interpolating samples, extrapolating samples, filtering samples including averaging and weighted averaging multiple samples, recognizing patterns of corrupted samples, applying correction schemas, recognizing user or other inputs to direct 2-D or 3-D displays, and the display, storage, or communication of results according to the processes of the present invention.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of claims to be included in a subsequently filed utility patent application, the invention may be practiced otherwise than as specifically described herein.

Embodiments of the present invention may relate to one or more of the enumerated example embodiments below, each of which are examples, and, as with any other related discussion provided above, should not be construed as limiting any previously described embodiments, examples, or aspects of the invention described above or any claim or claims provided yet further below as they stand now or as later amended, replaced, or added. Likewise, these examples should not be considered as limiting with respect to any claim or claims of any related patents and/or patent applications (including any foreign or international counterpart applications and/or patents, divisionals, continuations, re-issues, etc.). Thus, by way of further examples, in various embodiments, the invention comprises, and may be embodied, as, for example:

Enumerated Example Embodiment (EEE) Set #1

EEE1. A method, comprising the step of correcting a sample error color error in a least one pixel of a first image in a video stream wherein the color error comprises color bleeding from a pixel of a second image in the video stream.

EEE1B. The method according to, for example, SET 1 EEE1, wherein the sample error is caused by one of a interpolation conversion, and scaling of at least part of the video stream.

EEE1C. The method according to, for example, SET 1 EEE1, wherein the sample error is caused by a conversion between resolutions of the content of the video stream.

EEE1D. The method according to, for example, SET 1 EEE1, wherein the images are left and right views of a stereo pair.

EEE2. The method according to, for example, SET 1 EEE1, wherein the first image and the second image are part of a same frame in the video stream.

EEE3. The method according to, for example, SET 1 EEE1, wherein the color bleeding comprises bleeding induced by an up-conversion of a frame containing the first image and the second image.

EEE4. The method according to, for example, SET 1 EEE3, wherein the up-conversion comprises a color space conversion.

EEE5. The method according to, for example, SET 1 EEE3, wherein the color space conversion comprises an expansion of color encoded data in a frame of the video stream.

EEE6. The method according to, for example, SET 1 EEE3, wherein the conversion comprises a 4:2:0 to 4:4:4 upconversion.

EEE6B. The method according to, for example, SET 1 EEE3, wherein the conversion comprises a 4:2:0 to 4:2:2 upconversion.

EEE6C. The method according to, for example, SET 1 EEE3, wherein the conversion comprises a color format conversion.

EEE6D. The method according to, for example, SET 1 EEE6C, wherein the color format conversion comprises a YcbCr to RGB conversion.

EEE6E. The method according to, for example, SET 1 EEE6C, wherein the color format conversion comprises a non-linear conversion involving neighboring samples.

EEE7. The method according to, for example, SET 1 EEE3, wherein the conversion comprises a conversion to at least one of 4:2:2, 4:4:4, and 8:4:4.

EEE8. The method according to, for example, SET 1 EEE1, wherein the color bleeding comprises bleeding induced by a combination of an up-conversion of the first and second images and a scheme by which the first and second images are interleaved within the video stream.

EEE9. The method according to, for example, SET 1 EEE8, wherein the scheme comprises a pixel-by-pixel checkerboard interleaving of the first image and the second image within a same frame of the video stream.

EEE10. The method according to, for example, SET 1 EEE1, wherein the first image and the second image are interleaved within a same frame of the video stream.

EEE11. The method according to, for example, SET 1 EEE1, further comprising the step of recognizing an up-converted interleaved video stream and enabling the step of correcting.

EEE11B. The method according to, for example, SET 1 EEE1, further comprising the step of embedding metadata in the video stream.

EEE11C. The method according to, for example, SET 1 EEE11B, wherein the metadata comprises one of HDMI metadata or a watermark on the video stream.

EEE11D. The method according to, for example, SET 1 EEE11B, wherein the metadata comprises information about how to correct errors in the video stream.

EEE11E. The method according to, for example, SET 1 EEE11B, wherein the metadata is embedded in a beginning portion of the video stream (e.g., a first line of the video stream).

EEE12. The method according to, for example, SET 1 EEE11, wherein the step of recognizing comprises comparing at least one known pattern of pixel error locations in the first image with corresponding pixel values in the second image.

EEE13. The method according to, for example, SET 1 EEE12, wherein the known pattern of known pixel error locations comprises a color bleeding pattern resulting from an up-conversion of the first and second images while interleaved.

EEE14. The method according to, for example, SET 1 EEE13, wherein the interleaved images comprise a checkerboard interleaving of the images.

EEE15. The method according to, for example, SET 1 EEE1, wherein the step of correcting comprises substituting a neighboring pixel.

EEE16. The method according to, for example, SET 1 EEE15, wherein the neighboring pixel is a neighboring pixel of a same image as the substituted pixel.

EEE16B. The method according to, for example, SET 1 EEE1, wherein the step of correcting comprises filtering over multiple neighboring samples.

EEE16C. The method according to, for example, SET 1 EEE1, wherein the step of correcting comprises filtering using temporal neighbors.

EEE16D. The method according to, for example, SET 1 EEE16C, wherein the filtering comprises at least one of motion adaptive and motion compensated methods.

EEE16E. The method according to, for example, SET 1 EEE1, wherein the step of correcting comprises inverse filtering to place the samples in an original space and then up-converting with a different filter.

EEE16F. The method according to, for example, SET 1 EEE1, wherein the step of correcting comprises inverse filtering to place the samples in an original color space after having been filtered in an up-conversion using samples of different views, and then performing filtering without data from different views.

EEE17. The method according to, for example, SET 1 EEE16, wherein the neighboring pixel is a same direction relative to the substituted pixel as other neighboring pixels used for substitution of other pixels in the image.

EEE18. The method according to, for example, SET 1 EEE1, wherein the step of correcting comprises correcting color in pixels identified by a pattern of color errors induced by an interleaving pattern of the images.

EEE19. The method according to, for example, SET 1 EEE1, wherein the step of correcting comprises correcting color in pixels according to a pattern of errors occurring due to an up-conversion of the images.

EEE20. The method according to, for example, SET 1 EEE1, wherein the step of correcting comprises correcting color in pixels identified by a pattern of color errors induced by an interleaving pattern of the images and a scheme for up-converting the images.

EEE Set #2

EEE1. A correction device, comprising:

a correction mechanism configured to correct errors in a data stream;

wherein the errors comprise data bleeding between different portions of the data stream due to a conversion of the data stream not intended for a format of the different portions.

EEE2. The correction device according to, for example, SET 2 EEE1, wherein the data stream comprises a video data stream, the errors comprise color errors, the different portions comprise separate images of a same frame in the video stream, and the conversion comprises a video image format conversion.

EEE3. The correction device according to, for example, SET 2 EEE2, wherein the video format conversion comprises a conversion to a 4:4:4 format.

EEE3B. The correction device according to, for example, SET 2 EEE2, wherein the video format conversion comprises a conversion to one of a 4:2:0, 4:2:2, 4:4:4, and 8:4:4 format.

EEE4. The conversion device according to, for example, SET 2 EEE1, wherein the conversion comprises an expansion of at least part of the data stream.

EEE5. The correction device according to, for example, SET 2 EEE1, wherein the data stream comprises an audio data stream, and the errors comprise errors that alter an intended content of at least one of the audio programs.

EEE6. The conversion device according to, for example, SET 2 EEE1, further comprising a buffer configured to temporarily store N data words from at least one portion of the data stream near an error; wherein the correction mechanism is further configured to correct the error via one of substitution, filtering, interpolation, and extrapolation of the N data words.

EEE7. The correction device according to, for example, SET 2 EEE6, wherein error is corrected based on a color content of at least one of neighboring pixel in a same portion of the data stream and pixels of another portion of the data stream corresponding to the pixel being corrected.

EEE8. The correction device according to, for example, SET 2 EEE7, wherein portions comprise different views of a video image.

EEE9. The correction device according to, for example, SET 2 EEE1, wherein the errors are corrected serially to produce a corrected data stream.

EEE10. The conversion device according to, for example, SET 2 EEE1, wherein the corrections are performed according to, for example, a pattern induced by a combination of an internal format of the data stream and the conversion.

EEE11. The conversion device according to, for example, SET 2 EEE1, further comprising a selection device configured to select a schema for the error correction.

EEE12. The conversion device according to, for example, SET 2 EEE11, wherein the selected schema is based on metadata in the video stream.

EEE13. The conversion device according to, for example, SET 2 EEE11, wherein the selected schema is based on a recognition of a pattern of data bleeding between the different portions.

EEE14. The conversion device according to, for example, SET 2 EEE11, wherein the schema comprises a pattern of pixels to be corrected and at least one of a substitution pattern, a filter, an interpolation, and an extrapolation of at least one other pixels in the data stream used to determine the correction.

EEE15. The conversion device according to, for example, SET 2 EEE1, wherein the conversion device is packaged as a converter box type add-on device having an input configured to receive the data stream and an output configured to output the corrected data stream.

EEE16. The conversion device according to, for example, SET 2 EEE15, further comprising a decryption mechanism configured to decrypt the data stream prior to correction.

EEE17. The conversion device according to, for example, SET 2 EEE16, wherein the input comprises an HDMI compatible input and the decryption capability comprises an HDCP compatible decryption.

EEE17B. The conversion device according to, for example, SET 2 EEE16, wherein the input comprises one of an HDMI compatible input, a DVI compatible input, a displayport compatible input, and another type of video input.

EEE18. The conversion device according to, for example, SET 2 EEE15, wherein the converter box is sold in conjunction with a pair of 3D glasses.

EEE19. The conversion device according to, for example, SET 2 EEE1, further comprising a recognition device configured to recognize the bleeding between different portions of the data stream and enable the correction mechanism.

EEE20. The conversion device according to, for example, SET 2 EEE1, further comprising:

a recognition device configured to recognize an error pattern in the data stream; and a set-up device configured to set up the correction mechanism to correct the recognized error pattern.

EEE21. The correction device according to, for example, SET 2 EEE20, wherein the recognition device is configured to recognize error patterns comprising error patterns caused by at least one of a checkerboard, line-by-line, and side-by-side formatting of the different portions.

EEE Set #3

EEE1. A correction device, comprising:

a correction mechanism configured to correct image data errors in a video stream;

wherein the image data errors comprise errors induced by an up-conversion of at least part of the image data when the image data is formatted differently than a format intended for the up-conversion.

EEE2. A correction device, comprising:

a correction mechanism configured to correct image data errors in a video data stream comprising a plurality of video program streams formatted together;

wherein the image data errors comprise errors induced by an up-conversion of at least part of the video data stream which would not have occurred if the video program streams were formatted separately.

EEE3. The correction device according to, for example, SET 3 EEE2, wherein the video program streams formatted together comprises an interleaving of the video program streams within each frame of the video data stream.

EEE4. A correction device configured to correct color image data errors in a data stream caused by a combination of a conversion of the data stream and a plurality of images formatted within at least one frame of the data stream.

EEE5. The correction device according to, for example, SET 3 EEE4, wherein the corrections are performed by changing pixel color values in pixels forming a repeating pattern of color bleeding in at least one of the images after being up-converted.

EEE Set #4A

EEE1. A system comprising a decoder configured to receive a video signal comprising interleaved image views and perform a color-space conversion separately on each of the interleaved images.

EEE2. The system according to, for example, Set 4A EEE1, wherein the color space conversion comprises at least one of an interpolation of chroma samples and replication of chroma samples from and for chroma samples from a same view.

EEE3. The system according to, for example, Set 4A EEE1, wherein the system is part of a media source.

EEE4. The system according to, for example, Set 4A EEE3, wherein the media source comprises at least one of a set-top box, a cable box, a satellite receiver, an ATSC tuner, a Blu-Ray disc player, a computer graphics card, a display, a display adapter, a hard drive, a memory stick, a camera, a video camera, and other media sources.

EEE5. The system according to, for example, Set 4A EEE3, wherein the media source comprises a network connection.

EEE6. The system according to, for example, Set 4A EEE1, wherein the color space conversion is performed with consideration to a format of the interleaved views.

EEE7. The system according to, for example, Set 4A EEE6, wherein the consideration comprises only selecting color space data for calculating converted values most likely to approximate the original image.

EEE8. The system according to, for example, Set 4A EEE7 wherein the most likely color space data to approximate the original image comprises nearby samples form a same view.

EEE9. The system according to, for example, Set 4A EEE1, wherein the color space conversion comprises an up-conversion comprising a conversion to one of 4:2:2, 4:4:4, and 8:4:4.

EEE10. The system according to, for example, Set 4A EEE1, wherein the color space conversion comprises a down conversion.

EEE11. The system according to, for example, Set 4A EEE10, wherein the down conversion comprises a down conversion from a1080p checkerboard interleaved content to at least one of a 720p and 1080i.

EEE12. The system according to, for example, Set 4A EEE11, wherein the down converted content comprises 3-D imagery.

EEE Set #4B

EEE1. A system, comprising:
a media source comprising a decoder configured to decode a video stream and an upconverter configured to up-convert the decoded video stream;
a correction device configured to correct color errors in the up-converted decoded video stream;
wherein the color errors comprise bleeding between two separate data portions within a frame of the up-converted decoded video stream.

EEE1B. The system according to, for example, Set 4B EEE1, wherein the decoder is signaled using metadata in the video stream.

EEE2. The system according to, for example, Set 4B EEE1, wherein the two separate portions separate images within the frame.

EEE3. The system according to, for example, Set 4B EEE2, wherein the two separate images comprise left and right channels of a 3D image.

EEE4. The system according to, for example, Set 4B EEE1, further comprising a pair of 3D viewing glasses.

EEE5. The system according to, for example, Set 4B EEE1, further comprising a display configured to receive the frame containing the separate images.

EEE6. The system according to, for example, Set 4B EEE1, wherein data values of the separate images are interleaved within the frame.

EEE6B. The system according to, for example, Set 4B EEE6, wherein the separate images are checkerboard interleaved within the frame.

EEE7. The system according to, for example, Set 4B EEE1, further comprising a selection mechanism configured to accept a selection comprising one of the separate images and cause the selected image and any corresponding images within the stream to be output after correction.

EEE7B. The system according to, for example, Set 4B EEE7, wherein the selection mechanism comprises at least one of a user input and metadata in the video stream.

EEE8. The system according to, for example, Set 4B EEE7, wherein the selected image and corresponding images comprises one channel of a 3D image.

EEE9. The system according to, for example, Set 4B EEE8, further comprising a 2D display configured to receive and display the selected 3D channel.

EEE Set #5

EEE1. A device, comprising:
an input configured to receive a video stream;
a de-converter configured to reconvert a converted video stream to an original color space;
a correction device configured to correct color values of the de-converted video stream; and
a converter configured to convert a color space of the corrected de-converted video stream to a required color space.

EEE2. The device according to, for example, Set 5 EEE1, wherein the required color space comprises an HDMI compatible color space.

EEE2B. The device according to, for example, Set 5 EEE1, wherein the required color space comprises one of an HDMI compatible color space, a DVI compatible color space, and a display port compatible color space.

EEE3. The device according to, for example, Set 5 EEE1, wherein the deconverter, correction device, and converter perform an operation comprising:

$$\begin{bmatrix} C_0^C \\ C_1^C \\ C_2^C \end{bmatrix} = \begin{bmatrix} a_{00} & a_{01} & a_{02} \\ a_{10} & a_{11} & a_{12} \\ a_{20} & a_{21} & a_{22} \end{bmatrix}$$

$$\begin{bmatrix} c_{00} \times C_0^B + c_{01} \times C_1^B + c_{02} \times C_2^B + d_0 \\ c_{10} \times C_0^T + c_{11} \times C_1^T + c_{12} \times C_2^T + d_1 \\ c_{20} \times C_0^T + c_{21} \times C_1^T + c_{22} \times C_2^T + d_2 \end{bmatrix} + \begin{bmatrix} b_0 \\ b_1 \\ b_2 \end{bmatrix} C_x^B C_x^T C_x^C$$

where the video stream has been previously upconverted via an operation comprising:

$$\begin{bmatrix} C_0 \\ C_1 \\ C_2 \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} A_0 \\ A_1 \\ A_2 \end{bmatrix} + \begin{bmatrix} b_0 \\ b_1 \\ b_2 \end{bmatrix}$$

and

-continued $$\begin{bmatrix} A_0 \\ A_1 \\ A_2 \end{bmatrix} = \begin{bmatrix} c_{00} & c_{01} & c_{02} \\ c_{10} & c_{11} & c_{12} \\ c_{20} & c_{21} & c_{22} \end{bmatrix} \begin{bmatrix} C_0 \\ C_1 \\ C_2 \end{bmatrix} + \begin{bmatrix} d_0 \\ d_1 \\ d_2 \end{bmatrix} nn$$

where $C^T{}_X$ are neighboring samples without errors $C^B{}_x$ are samples for a current pixel with problems, and $C^C{}_x$, are the computed color corrected samples.

EEE Set #6

EEE1. A method, comprising the steps of:
deinterleaving and upsampling checkerboard interleaved left and right views of a 3D video stream; and
repackaging the de-interleaved upsampled left and right views into a native 3D delivery format.

EEE2. The method according to, for example, Set 6 EEE1, wherein the native 3D delivery format comprises one of a side-by-side, row-by-row, column-by-column, and full left view/full right view native 3D delivery format.

EEE3. A method comprising the steps of:
receiving 3D video data in a first format;
correcting at least one portion of the 3D video data; and
converting the corrected 3D video data to a native delivery format.

EEE4. The method according to, for example, Set 6 EEE3, wherein the first format comprises a checkerboard format, and the native delivery format comprises one of a side-by-side, row-by-row, column-by-column, and full left view/full right view formats.

EEE Set #7

EEE1. A display, comprising:
a viewing screen having a native 3D format;
a converter configured to receive non-native 3D input signals, reformat the non-native 3D input signals to the native 3D format, and provide the converted native 3D format signals to the viewing screen.

EEE2. The display according to, for example, Set 7 EEE1, wherein the native 3D format is a checkerboard 3D format.

EEE3. The display according to, for example, Set 7 EEE1, wherein the native 3D format is not a checkerboard 3D format.

EEE4. The display according to, for example, Set 7 EEE1, wherein the non-native 3D input signals comprise at least one of a side-by-side, row-by-row, column-by-column, and full left view/full right view formats.

EEE Set #8

EEE1. A set-top box, comprising at least one converter configured to convert a format of the 3D video signal to delivery format of a 3D capable display.

EEE2. The set-top box according to, for example, Set 8 EEE1, further comprising:
a plurality of converters each configured to convert the format of the 3D video signal to one of a plurality of potential delivery formats; and
a selector configured to select one of the converters comprising a delivery format matching the delivery format of the 3D capable display.

EEE Set #9

EEE1. A converter configured to receive a 3D video signal in a first format, convert the 3D video signal in the first format to a second format, and output a 3D video signal in the second format.

EEE2. The converter according to, for example, Set 9 EEE1, wherein the converter is installed in a Blu-ray disc player.

EEE3. The converter according to, for example, Set 9 EEE1, wherein the converter is installed in a display.

EEE4. The converter according to, for example, Set 9 EEE1, wherein the converter is installed in a set-top box.

EEE5. The converter according to, for example, Set 9 EEE1, wherein the converter is installed in a video device.

EEE6. The converter according to, for example, Set 9 EEE1, wherein the first format comprises at least one of checkerboard, side-by-side, row-by-row, column-by-column, and full left view/full right view formats, and the second format comprises at least one of checkerboard, side-by-side, row-by-row, column-by-column, and full left view/full right view formats.

EEE7. The converter according to, for example, Set 9 EEE1, further comprising:
a series of sub-converter devices each configured to convert the first format to one of a series of different second formats; and
a selector configured to select which of the sub-converter devices converts the 3D video signal in the first format to the second format.

EEE8. The converter according to, for example, Set 9 EEE6, wherein the selector utilizes at least one of samples of the 3D video signal in the first format, metadata, and set-up data to determine the selected sub-converter device.

EEE9. The converter according to, for example, Set 9 EEE1, wherein the converter is an integral part of at a 3D ready display having a plurality of "native" 3D input formats.

What is claimed:

1. A method for correcting stereoscopic image data, comprising:
receiving stereoscopic image data, said stereoscopic image data comprising 3D image data interleaved with a first view image data and a second view image data, said stereoscopic image data comprising a checkerboard data format of said interleaved first view and second view image data;
decoding said stereoscopic image data for rendering on a target display; and
correcting a color error in at least one pixel of a first view in a stereoscopic video stream wherein the color error comprises color bleeding from said at least one pixel of a first view into a pixel of a second view in the stereoscopic video stream; and
wherein further said color error is caused by de-interleaving said checkerboard data format.

2. The method according to claim 1, wherein the color error is caused by one of a interpolation conversion, and scaling of at least part of the video stream.

3. The method according to claim 1, wherein the color error is caused by a conversion between resolutions of the content of the video stream.

4. The method according to claim 1, wherein the color bleeding comprises bleeding induced by an up-conversion of a frame containing the first view and the second view.

5. The method according to claim 4, wherein the up-conversion comprises a color space conversion.

6. The method according to claim 4, wherein the color space conversion comprises an expansion of color encoded data in a frame of the video stream.

7. The method according to claim 1, wherein the color bleeding comprises bleeding induced by a combination of an up-conversion of the first view and second view and a scheme by which the first view and second view are interleaved within the video stream.

8. The method according to claim 1, wherein the first view and the second view are interleaved within a same frame of the video stream.

9. The method according to claim 1, further comprising the step of recognizing an up-converted interleaved video stream and enabling the step of correcting.

10. The method according to claim 9, wherein the step of recognizing comprises comparing at least one known pattern of pixel error locations in the first view with corresponding pixel values in the second view, and the known pattern of known pixel error locations comprises a color bleeding pattern resulting from an up-conversion of the first view and second view while interleaved.

11. The method according to claim 1, further comprising the step of embedding metadata in the video stream.

12. The method according to claim 11, wherein the metadata comprises information about how to correct errors in the video stream.

13. The method according to claim 1, wherein the step of correcting comprises substituting a neighboring pixel.

14. The method according to claim 1, wherein the step of correcting comprises filtering using temporal neighbors.

15. A device, comprising: an input configured to receive a stereoscopic video stream, said stereoscopic video stream further comprising a checkerboard data format of an interleaving of a first view image data and a second view image data; a de-converter configured to reconvert a converted stereoscopic video stream to an original color space; a correction device configured to correct color values of the de-converted stereoscopic video stream wherein correction is made to color error caused by de-interleaving said checkerboard data format; and a converter configured to convert a color space of the corrected de-converted stereoscopic video stream to a required color space.

16. The device according to claim 15, wherein the required color space comprises an HDMI compatible color space.

17. The device according to claim 15, wherein the required color space comprises one of an HDMI compatible color space, a DVI compatible color space, and a display port compatible color space.

18. The device according to claim 15, wherein the deconverter, correction device, and converter perform an operation comprising:

$$\begin{bmatrix} C_0^C \\ C_1^C \\ C_2^C \end{bmatrix} = \begin{bmatrix} a_{00} & a_{01} & a_{02} \\ a_{10} & a_{11} & a_{12} \\ a_{20} & a_{21} & a_{22} \end{bmatrix}$$

-continued $$\begin{bmatrix} c_{00} \times C_0^B + c_{01} \times C_1^B + c_{02} \times C_2^B + d_0 \\ c_{10} \times C_0^T + c_{11} \times C_1^T + c_{12} \times C_2^T + d_1 \\ c_{20} \times C_0^T + c_{21} \times C_1^T + c_{22} \times C_2^T + d_2 \end{bmatrix} + \begin{bmatrix} b_0 \\ b_1 \\ b_2 \end{bmatrix} | C_x^B C_x^T C_x^C$$

where the video stream has been previously upconverted via an operation comprising:

$$\begin{bmatrix} C_0 \\ C_1 \\ C_2 \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} A_0 \\ A_1 \\ A_2 \end{bmatrix} + \begin{bmatrix} b_0 \\ b_1 \\ b_2 \end{bmatrix}$$

and $$\begin{bmatrix} A_0 \\ A_1 \\ A_2 \end{bmatrix} = \begin{bmatrix} c_{00} & c_{01} & c_{02} \\ c_{10} & c_{11} & c_{12} \\ c_{20} & c_{21} & c_{22} \end{bmatrix} \begin{bmatrix} C_0 \\ C_1 \\ C_2 \end{bmatrix} + \begin{bmatrix} d_0 \\ d_1 \\ d_2 \end{bmatrix} | nn$$

where $C_x^T$ are neighboring samples without errors, $C_x^B$ are samples for a current pixel with problems, and $C_x^C$ are the computed color corrected samples.

19. A display, comprising:

a viewing screen having a native 3D format;

a converter configured to receive 3D input signals comprising a checkerboard data format of interleaved first view data and second view data, reformat the 3D input signals to the native 3D format, and provide the converted native 3D format signals to the viewing screen; and wherein said converter further comprises a correction device configured to correct color values of a stereoscopic video stream by correcting color bleeding from a first view into a second view in the stereoscopic video stream, said color bleeding resulting from the deinterleaving of the 3D input signals.

20. The display according to claim 19, wherein the native 3D format is a checkerboard 3D format.

21. The display according to claim 19, wherein the native 3D format is not a checkerboard 3D format.

22. The display according to claim 19, wherein the non-native 3D input signals comprise at least one of a side-by-side, row-by-row, column-by-column, and full left view/full right view formats.

* * * * *